(12) United States Patent
Kim

(10) Patent No.: US 6,427,377 B1
(45) Date of Patent: Aug. 6, 2002

(54) FISHING TACKLE BOX WITH LINE WINDER

(76) Inventor: Chong Soo Kim, 734 Timberland La., Walnut, CA (US) 91788

( * ) Notice: Subject to any disclaimer, the term of this patent is extended or adjusted under 35 U.S.C. 154(b) by 0 days.

(21) Appl. No.: 09/698,658

(22) Filed: Oct. 27, 2000

(51) Int. Cl.7 .............................................. A01K 97/06
(52) U.S. Cl. ................... 43/54.1; 43/4; 43/4.5
(58) Field of Search ................ 43/54.1, 57.1, 43/57.2, 5; 206/373, 315.11; 242/129.6, 137.1, 599.4, 597.6, 395

(56) References Cited

U.S. PATENT DOCUMENTS

| | | | | |
|---|---|---|---|---|
| 2,400,943 A | * | 5/1946 | Morgan et al. | 242/77 |
| 2,585,999 A | * | 2/1952 | Bunch | 242/115 |
| 3,876,045 A | * | 4/1975 | Knarreborg | 191/12.2 |
| 4,791,752 A | * | 12/1988 | Van Kampen | 43/54.1 |
| 5,139,213 A | | 8/1992 | Furomoto | 242/279 |
| 5,331,761 A | | 7/1994 | Kuthy | 43/21.2 |
| 5,636,469 A | | 6/1997 | Pizzolo et al. | 43/54.1 |
| 5,957,321 A | * | 9/1999 | Jones | 220/533 |
| 6,056,051 A | * | 5/2000 | Coronado | 166/134 |

* cited by examiner

*Primary Examiner*—Charles T. Jordan
*Assistant Examiner*—Bret Hayes
(74) *Attorney, Agent, or Firm*—Lee & Hong

(57) ABSTRACT

A fishing tackle apparatus comprises a base housing having at least one compartment, a lid hinged with the base housing for movement between a closed position covering the base housing and an open position exposing the compartment. The compartment is defined by upstanding side walls, two opposite facing front and rear walls have vertical slits form from a top of the walls to receive therein the crank fitted with the spool. A crank fitted with a spool for winding fishing lines onto the spool is installed in the compartment for winding used fishing line from or to the fishing reel. The crank comprises a shaft connected to a handle. The shaft has an adapter with grooved outer surface to securely engage the spool without slipping. The spool has a center aperture with inner grooves to engage the adapter of the shaft without slipping. The compartment has opposite facing side walls having a plurality of parallelly disposed vertical grooves for receiving therein a partition to adjust the length of the compartment to receive a spool of varying size. The partition has a vertical slit to receive the crank.

9 Claims, 3 Drawing Sheets

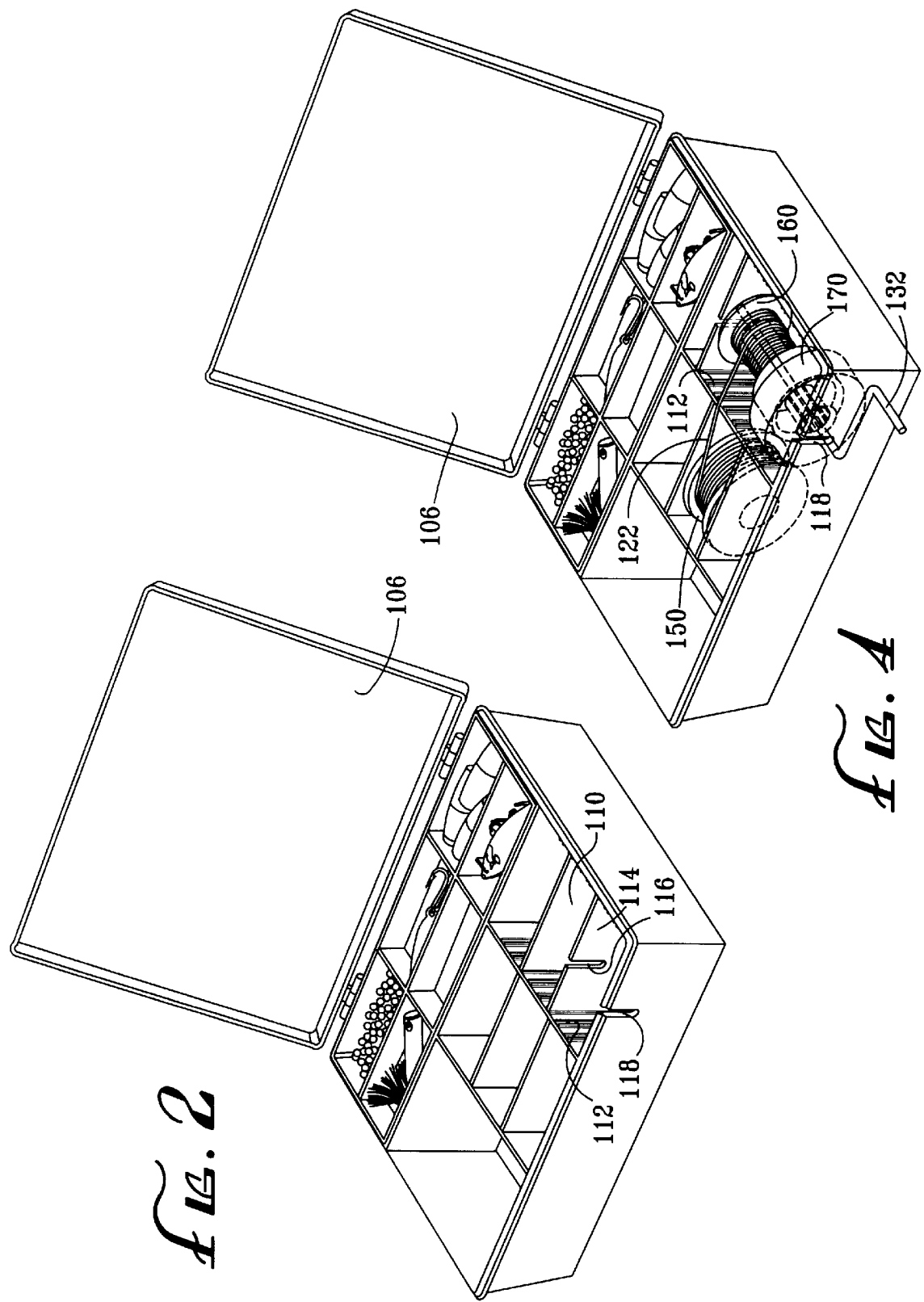

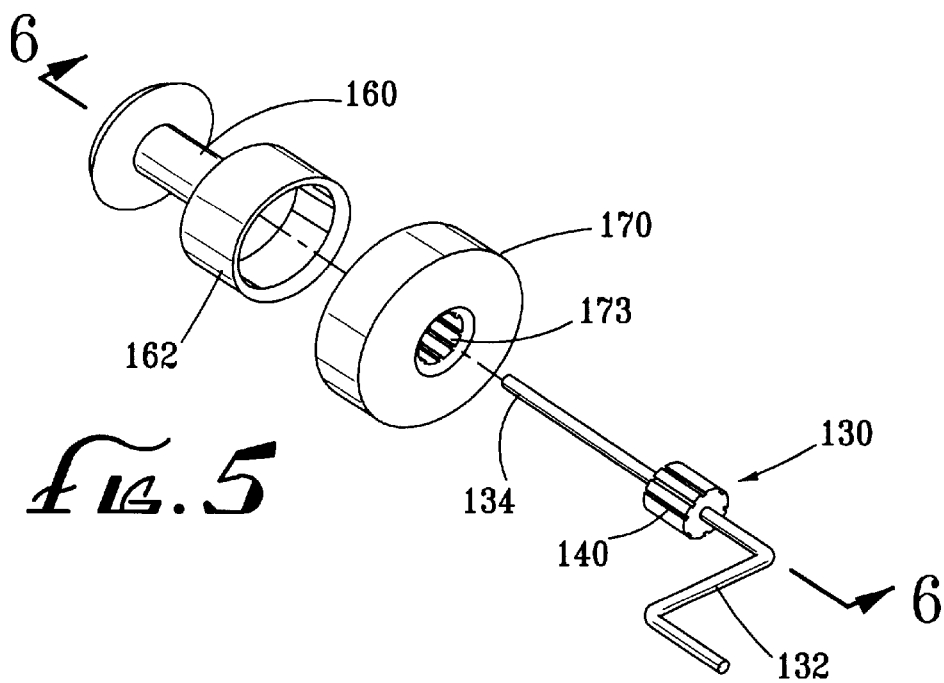
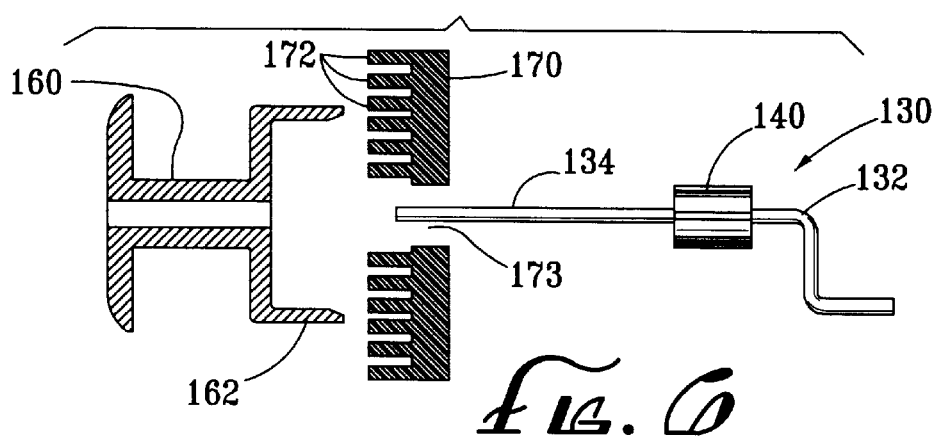
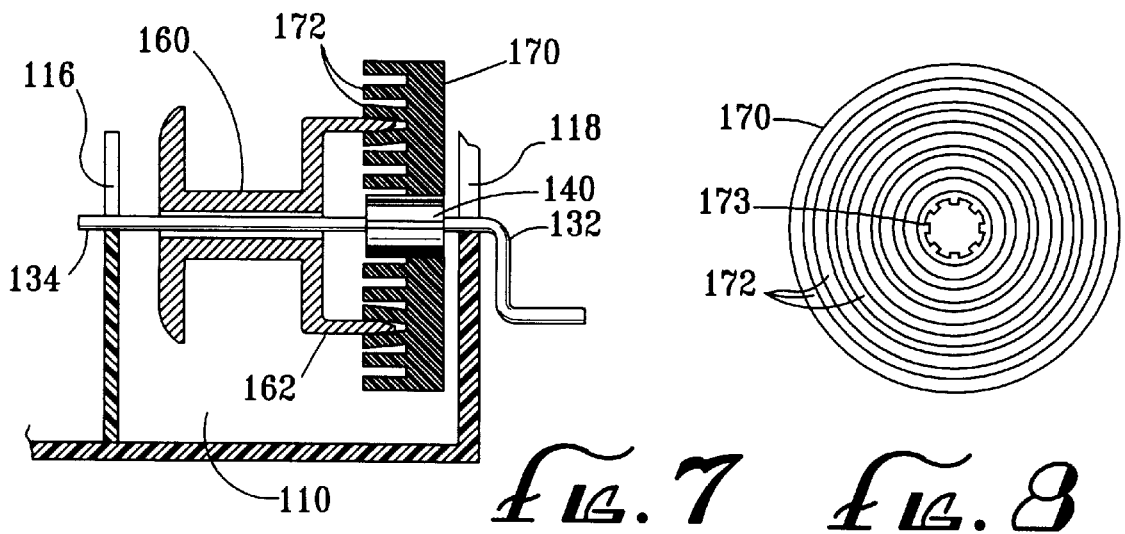

FISHING TACKLE BOX WITH LINE WINDER

BACKGROUND OF THE INVENTION

1. Field of the Invention

The present invention relates generally to fishing equipment and more particularly, to an improved apparatus which serves as a fishing tackle box and fishing line winder.

2. Discussion of the Related Art

The variations of fishing tackle boxes as employed by fishermen are practically endless. Every sport or recreational fisherman utilizes one or more container devices to house and provide transport for fishing equipment, including, tackles, line, floats, bait container, fish cleaning tool, hooks, sinkers, leaders and lures.

A conventional tackle box, although convenient for storing tackles and baits, falls far short of providing a convenient storage of spent or used fishing lines. Various types of fishing tackle boxes have been devised, most of which have hinged lids and compartments for the storage of various items of fishing equipment. Some fishing tackle boxes have a clamp for attaching a fishing pole.

The conventional tackle boxes have a number of disadvantages. In most instances, the tackle box has no means for winding fishing lines from fishing reel or vice versa. Fresh or new line equates to big fish. Alternatively, a line having a different thickness may be necessary to catch certain types of fish. Fishermen are well aware that one needs to change fishing line often to catch different variety of fish. As a result, wrong-gauge fishing lines from a fishing reel must be unwound by hand and discarded when fishermen are on fishing boats.

A conventional fishing line remover uses a power source, such as a power drill, to quickly change the line on the fishing reels. Such a device might be just fine for removing fishing lines at home or a shop. However, fishermen do not carry power drills when they are going fishing. In addition, most such devices are complicated, expensive, heavy, cumbersome to carry and difficult to assemble and use.

Accordingly, there is a need for a simple, inexpensive and durable fishing line remover and winder which will permit the fisherman to readily remove or wind fishing lines from or to fishing reels without the use of electricity and which can be combined with the ever present fishing tackle box and can be stored therein in a minimum amount of space.

SUMMARY OF THE INVENTION

Accordingly, the present invention is directed to a fishing tackle box with line winder that substantially obviates one or more of the problems due to limitations and disadvantages of the related art.

It is, therefore, an objective of the present invention to provide a combination fishing tackle box with line winder.

It is also an object of the present invention to provide a device that is light weight, easily attachable and removable from the tackle box without using any tools.

It is also an object of the present invention to provide a device that can be used without a power source or power drill.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a fishing tackle apparatus comprises a base housing having at least one compartment; and a lid hinged with the base housing for movement between a closed position covering the base housing and an open position exposing the compartment. The compartment is defined by upstanding side walls, two opposite facing front and rear walls have vertical slits form from a top of the walls to receive therein the crank fitted with the spool. A crank fitted with a spool for winding fishing lines onto the spool is installed in the compartment.

According to one aspect of the present invention, the crank comprises a shaft connected to a handle. The shaft has an adapter with grooved outer surface to securely engage the spool without slipping. The spool has a center aperture with inner grooves to engage the adapter of the shaft without slipping.

According to another aspect of the present invention, the compartment has opposite facing side walls having a plurality of parallelly disposed vertical grooves for receiving therein a partition to adjust the length of the compartment to receive a spool of varying size. In that regard, the partition has a vertical slit to receive the crank.

According to another embodiment of the present invention, a fishing tackle apparatus for winding a fish line onto a spinning reel comprises a base housing having at least one compartment; and a lid hinged with the base housing for movement between a closed position covering the base housing and an open position exposing the compartment. The compartment is defined by upstanding side walls, two opposite facing front and rear walls have vertical slits form from a top of the walls to receive therein the crank fitted with the spool. A crank having a shaft sufficiently long is placed between the vertical slits. A reel receptor is fitted around the crank in surrounding relation thereof. The reel receptor has at least one raised rim to securely hold the spinning reel.

According to one aspect of the present invention, the reel receptor has a plurality of concentrically raised rims to receive therein the spinning reel of varying diameters.

According to another aspect of the present invention, the crank comprises a shaft connected to a handle. The shaft has an adapter with grooved outer surface to securely engage the reel receptor without slipping. The reel receptor has a center aperture with inner grooves to engage the adapter of the shaft without slipping.

According to another aspect of the present invention, the compartment has opposite facing side walls having a plurality of parallelly disposed vertical grooves for receiving therein a partition to adjust the length of the compartment to receive spinning reels of varying sizes. Preferably, the partition has a vertical slit to receive the crank.

It is to be understood that both the foregoing general description and the following detailed description are exemplary and explanatory and are intended to provide a further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

FIG. 2 illustrates a perspective view of the present invention without the spool and the fishing reel;

FIG. 4 illustrates a perspective view of the present invention being used with a spinning reel;

FIG. 5 illustrates an assembly view of the spinning reel, reel receptor and crank according to the present invention;

FIG. 6 illustrates a cross-sectional view of FIG. 5;

FIG. 7 illustrates a cross-sectional view of the reel receptor with the spinning reel placed in the fishing tackle box; and FIG. 8 illustrates a front elevation view of the reel receptor shown in FIGS. 6 and 7.

DETAILED DESCRIPTION OF THE PREFERRED EMBODIMENTS

With reference to the drawings, and in particular to FIGS. 1–8 thereof, a combination fishing tackle box and line winder embodying the principles and concepts of the present invention will be described.

Figure 1:
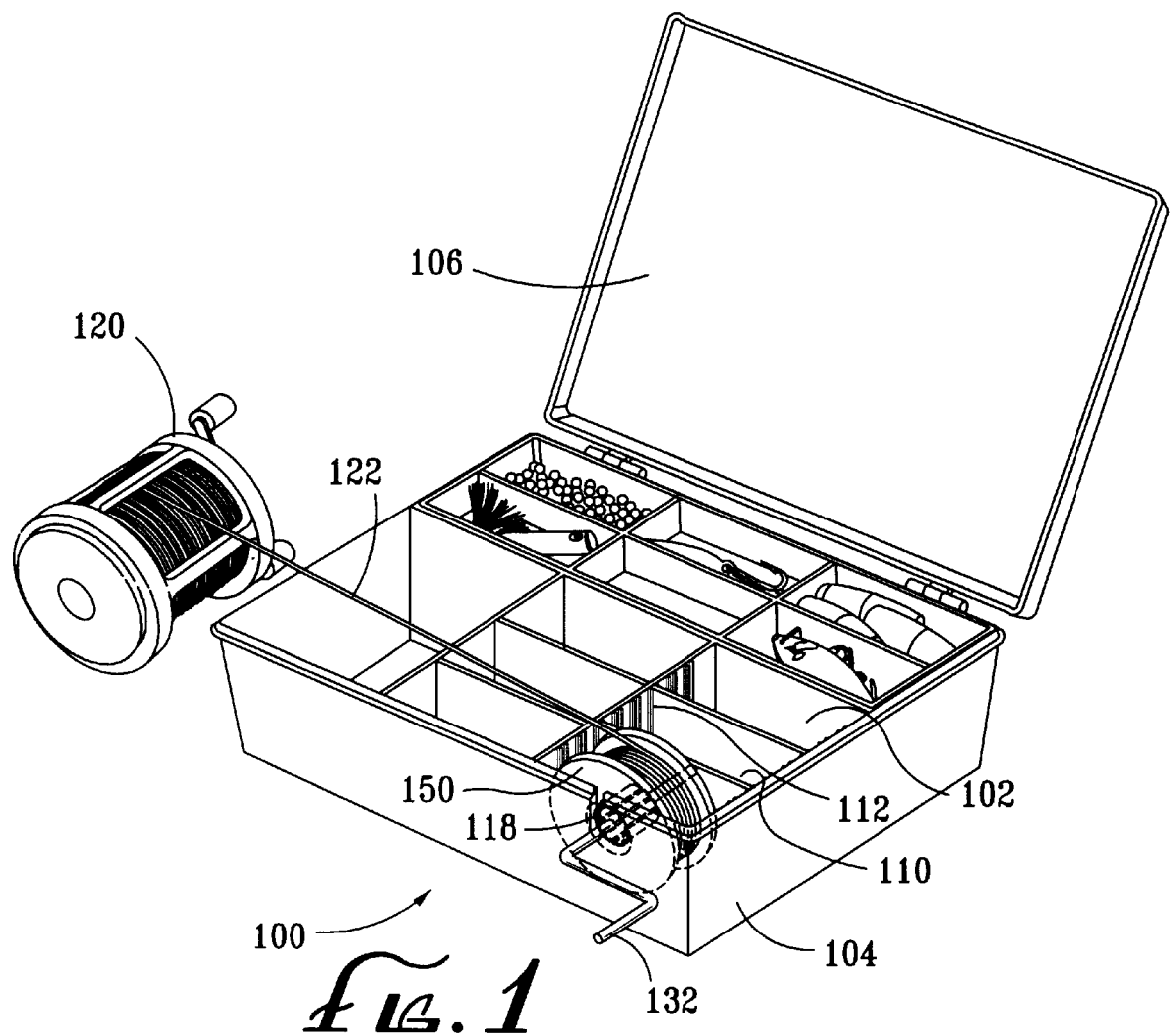
FIG. 1 illustrates a perspective view of a tackle box with fishing line winder according to a first embodiment of the present invention.

FIG. 1 illustrates a perspective view of a combination tackle box with fishing line winder according to a first embodiment of the present invention. FIG. 2 illustrates a perspective view of the present invention without the spool and the fishing reel. Referring to FIG. 1, the present invention comprises a tackle box 100 which is preferably of a rectangular configuration. The tackle box 100 includes a base housing 104 and a matching rectangularly shaped lid 106 hinged with the base housing 104 to provide a sealed unit when the lid 106 is closed. The base housing 104 has a plurality of compartments 102 for storing therein baits, tackles, lures, lines and other fishing tools. The compartments 102 are preferably of varying width and length dimensions for the obvious intention of accommodating the storage of diverse fishing tackle. The plurality of compartments 102 is formed by either securely fixed or adjustable vertical partitions. In addition, the tackle box 100 may include a removable lift-up tray with compartments for storing similar items.

In the preferred embodiment, the tackle box 100 includes a line winder compartment 110. The line winder compartment 110 comprises a plurality of vertical grooves 112 parallely formed along opposite facing walls. The vertical grooves 112 are equally distanced from each other. In the preferred embodiment of the present invention, a partition 114 is slidably installed between two corresponding vertical grooves 112. By adjusting the placement of the partition 114 along the vertical grooves 112, the width of the line winder compartment 110 is changed.

The partition 114 has a first vertical slit 116 for placing thereon one end of a crank 130. A second vertical slit 118 of the same length is also formed on a front wall of the base housing 104 to receive thereon the other end of the crank shaft 130. The first and second slits 116, 118 are aligned to hold the crank 130 in a substantially horizontal position with respect to the slits 116, 118. In an alternative embodiment, the second vertical slit 118 may be formed in a second partition placed in the line winder compartment 110.

Figure 3:
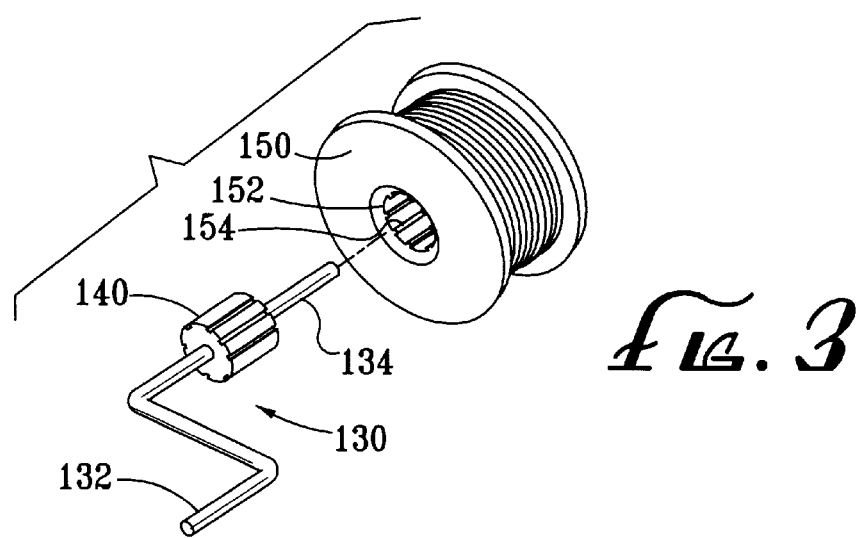
FIG. 3 illustrates a separated perspective view of a spool and a crank according to the present invention.

FIG. 3 illustrates a separated perspective view of a spool 150 and a crank 130 according to the present invention. The spool 150 is used for winding used fishing line from a fishing reel. The spool 150 may be of different size and width to accommodate fishing lines of different length. The spool 150 also has a center aperture 152 for receiving therein the crank 130. The center aperture 152 is centrally located and has grooved inner surface to prevent slipping of the crank 130 therein. The spool 150 is preferably made of any suitably rigid material, such as plastic, known to one of ordinary skill in the art.

The crank 130 comprises a handle 132 attached at right angle to a shaft 134. Placed on the shaft 134 is a cylindrical adapter 140 for used to firmly hold the spool 150 in its place. In particular, the adapter 140 has a grooved outer surface to match the grooved inner surface of the center aperture 152 of the spool 150 to prevent slippage.

When the crank 130 is placed in the spool 150, the entire assembly is placed in the first and second vertical slits 116 and 118 of the line winding compartment 110. A fishing reel 120 placed in adjacent compartment or outside of the base housing 104 provides a fishing line 122 which is wound onto the spool 150 by a rotating the crank 130.

FIG. 4 illustrates a perspective view of the present invention being used with a spinning reel 160. In particular, the present invention is being used to wind fishing line onto a spinning reel 160 from a spool containing the used fishing line 122. Conventionally, because the spool of a spinning reel does not rotate during winding of the fishing line, the fishing line gets twisted into a pig tail and eventually breaks during use. However, when the fishing line is wound onto the spinning reel 160 using the present invention, the fishing line does not get twisted due to direct winding onto the spinning reel.

FIG. 5 illustrates an assembly view of the spinning reel 160, reel receptor 170 and crank 130 according to the present invention. FIG. 8 illustrates a front elevation view of the reel receptor 170 shown in FIGS. 5, 6 and 7. The spinning reel 160 is being used in a typical fishing reel. The spinning reel 160 is detached from the fishing reel assembly and is fitted onto the reel adapter 170. The spinning reel 160 has a cylindrical base 162 that is generally screwed onto a reel assembly.

When used with the present invention, the cylindrical base 162 of the spinning reel 160 is placed onto the reel receptor 170. The reel receptor 170, as shown in FIG. 8, is equipped with a plurality of concentric protruding rims 172 having varying diameters. Preferably, there are about 3 to 8 concentric rims. The rims 172 are equally distanced between each other to accommodate different sized spinning reel 160. The rims 172 of the reel receptor 170 may be made of flexible rubber compound or other suitable materials known to one of ordinary skill in the art.

FIG. 6 illustrates a cross-sectional view of the spinning reel 160, the reel receptor 170 and the crank 130. FIG. 7 illustrates a cross-sectional view of the reel receptor 170 with the spinning reel 160 placed in the line winding compartment 110. Referring to FIGS. 7 and 8, the spinning reel 160 is securely placed in one of the concentric rims 172 of the reel receptor 170. Then, the shaft 134 portion of the crank 130 is slid into the center aperture 173 of the reel receptor 170 until the adapter 140 is firmly placed in the center aperture 173. The length of the shaft 134 is sufficiently long to protrude out of the spinning reel 160, as shown in FIG. 7.

The entire assembly of FIG. 7 is then placed in the line winding compartment 110 between the first and second vertical slits 116 and 118, as shown in FIG. 7. The perspective view of the spinning reel assembly placed in the line winding compartment 110 is illustrated in FIG. 4. Once installed, the spool 150 wound with the fishing line 122 is placed in adjacent compartment. The fishing line 122 is then wound onto the spinning reel 160 by rotating the crank 130.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A fishing tackle apparatus, comprising:

a base housing having at least one compartment;

a lid hinged with the base housing for movement between a closed position covering the base housing and an open position exposing the compartment, wherein the compartment is defined by upstanding side walls, two opposite facing front and rear walls have vertical slits form from a top of the walls to receive therein a crank fitted with a spool; and wherein the crank comprises a shaft connected to a handle, the shaft having an adapter with grooved outer surface to securely and releasable engage the spool without slipping so that the spool is easily replaced, and the spool has a center aperture with inner grooves to engage the adapter of the shaft without slipping.

2. The fishing tackle apparatus of claim 1, wherein the compartment has opposite facing side walls having a plurality of parallelly disposed vertical grooves for receiving therein a partition to adjust the length of the compartment to receive a spool of varying size.

3. The fishing tackle apparatus of claim 2, wherein the partition has a vertical slit to receive the crank.

4. A fishing tackle apparatus for winding a fish line onto a spinning reel, the fishing tackle apparatus comprising:

a base housing having at least one compartment;

a lid hinged with the base housing for movement between a closed position covering the base housing and an open position exposing the compartment, wherein the compartment is defined by upstanding side walls, two opposite facing front and rear walls have vertical slits form from a top of the walls to receive therein a crank fitted with a spool;

a crank having a shaft sufficiently long to be placed between the vertical slits; and a reel receptor fitted around the crank in surrounding relation thereof, wherein the reel receptor has at least one raised concentric rim to securely hold a spinning reel.

5. The fishing tackle apparatus of claim 4, wherein the reel receptor has a plurality of concentrically raise rims to receive therein the spinning reel of varying diameters.

6. The fishing tackle apparatus of claim 4, wherein the crank comprises a shaft connected to a handle, the shaft having an adapter with grooved outer surface to securely engage the reel receptor without slipping.

7. The fishing tackle apparatus of claim 6, wherein the reel receptor has a center aperture with inner grooves to engage the adapter of the shaft without slipping.

8. The fishing tackle apparatus of claim 4, wherein the compartment has opposite facing side walls having a plurality of parallelly disposed vertical grooves for receiving therein a partition to adjust the length of the compartment to receive spinning reels of varying sizes.

9. The fishing tackle apparatus of claim 8, wherein the partition has a vertical slit to receive the crank.

\* \* \* \* \*